(12) United States Patent
Lyon et al.

(10) Patent No.: US 9,201,572 B2
(45) Date of Patent: Dec. 1, 2015

(54) A/B TEST CONFIGURATION ENVIRONMENT

(71) Applicant: CBS INTERACTIVE INC., San Francisco, CA (US)

(72) Inventors: Clifford Lyon, Somerville, MA (US); Ron H. Rothman, Bridgewater, NJ (US)

(73) Assignee: CBS INTERACTIVE, INC., New York, NY (US)

( * ) Notice: Subject to any disclaimer, the term of this patent is extended or adjusted under 35 U.S.C. 154(b) by 350 days.

(21) Appl. No.: 13/796,813

(22) Filed: Mar. 12, 2013

(65) Prior Publication Data

US 2014/0282049 A1    Sep. 18, 2014

(51) Int. Cl.
*G06F 3/0482* (2013.01)
*G06F 3/0484* (2013.01)

(52) U.S. Cl.
CPC ............ *G06F 3/0484* (2013.01); *G06F 3/0482* (2013.01); *G06F 2203/04803* (2013.01)

(58) Field of Classification Search
CPC ... H04L 29/06; H04L 29/0809; G06F 9/4443; G06F 9/44543; G06F 3/00; G06F 3/048; G06F 3/0481; G06F 3/0482; G06F 3/0484
See application file for complete search history.

(56) References Cited

U.S. PATENT DOCUMENTS

| | | | | |
|---|---|---|---|---|
| 7,231,606 | B2* | 6/2007 | Miller et al. | 715/738 |
| 2006/0271671 | A1* | 11/2006 | Hansen | 709/224 |
| 2009/0282343 | A1* | 11/2009 | Catlin et al. | 715/738 |
| 2012/0290920 | A1* | 11/2012 | Crossley | 715/234 |

* cited by examiner

*Primary Examiner* — Xiomar L Bautista
(74) *Attorney, Agent, or Firm* — Kacvinsky Daisak Bluni, PLLC

(57) ABSTRACT

Various embodiments are generally directed to a visual configuration environment for configuring A/B tests of variations of aspects of content presentation in a user interface of a portal of a server to support remotely accessing services that it provides. A method includes identifying multiple visual areas of a visible portion of a user interface in a first data script; visually presenting on a display the multiple visual areas in at least one menu in a first table to enable selection of first and second visual areas of the multiple visual areas for inclusion in an A/B test of multiple versions of the user interface; and visually presenting a list of all possible combinations of variations in content presentation selected in response to the visual presentation of the first table for the first and second visual areas in the form of a second table. Other embodiments are described and claimed herein.

24 Claims, 12 Drawing Sheets

A/B TEST CONFIGURATION ENVIRONMENT

BACKGROUND

Multivariate testing (otherwise known as "split testing" or "A/B testing") is a common method of evaluating changes to website design and content. In a multivariate website test, two or more versions of a particular webpage are created; these are then displayed to randomly selected groups of site visitors. Usually, one of these versions is the current version of the webpage serving as an experimental control. A randomly selected subset of visitors to the website are presented this version, and they are referred to as a "control group." Randomly selected others of the visitors are randomly presented with another version that implements proposed changes to the current version, and it should be noted that there can be more than one of such other versions in which different proposed changes are implemented. Thus there could be one other group presented with a version implementing proposed changes, or more than one other group in which each of the other groups is presented with a different other version implementing different proposed changes.

The manner in which the visitors in each of the groups responds to the particular version presented to each of them is monitored. In particular, statistical data indicative of a rate at which one or more specific behaviors by visitors occurs in each of the groups are gathered. Typically, there is a desire to increase or decrease a rate of a specific behavior of visitors to a website (e.g., a rate of purchases of products or usage of a given service). The statistical data is subjected to one or more forms of statistical analysis to identify any statistically significant increase or decrease in a given behavior arising from a version of the webpage that implements proposed changes. If a given version implementing proposed changes is found to bring about a statistically significant improvement in the rate with which a specific behavior occurs (keeping in mind that an improvement may be an increase or a decrease in that rate, depending on what the specific behavior is), then that version implementing those proposed changes may be adopted as the new version of the webpage.

Some multivariate tests are simple, e.g., a straightforward A/B test. Many are more complex. An A/B test has one variable with two values; a more complex test may have several variables with several values each. As the number of variables and values increases, the number of web page versions (and correspondingly, the number of visitor test groups needed) increases rapidly. A complex test might require tens or even hundreds of visitor groups.

In multivariate forms of A/B testing in which multiple combinations of variations in content presentation in a user interface are proposed, the work of entering the specific combinations of variations to be tested can become overwhelming and cumbersome. Many currently available systems for specifying the exact proposed combinations of variations in user interface content presentation to be tested employ configuration environments that merely expand on longstanding configuration environments originally created to accommodate specifying only one variation per test, or at most, specifying multiple variations in only one area of content presentation in a user interface per test.

In multivariate user interface content testing, the number of possible combinations of variations of content presentation in a user interface to be tested increases exponentially each time one more area for content presentation and/or one more variation in content presentation is specified to be tested. By way of example, testing just a few variations of text size, with just a few variations of text font, with just a few variations of text color for presentation of textual content can quickly result in an unwieldy list of possible combinations of different text size, font and color that could be tested. It follows that entering such an unwieldy list of possible combinations can, itself, become unwieldy in a configuration environment that is ill suited to enable more graceful entry of so many possible combinations. It is with respect to these and other considerations that the techniques described herein are needed.

DETAILED DESCRIPTION

Figure 1:
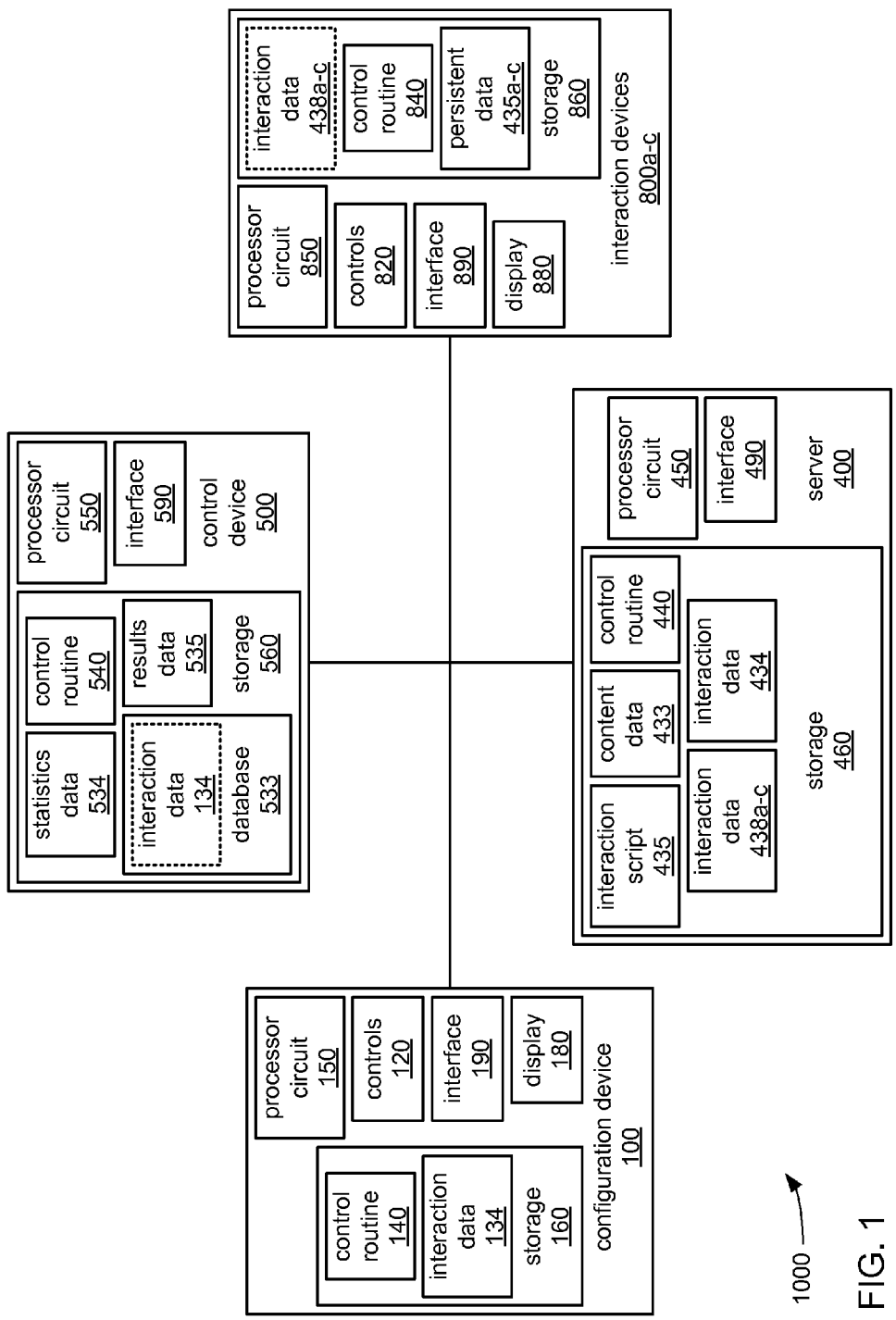
FIG. 1 illustrates a first embodiment of interaction among computing devices.

Various embodiments are generally directed to a visual configuration environment for configuring A/B tests of variations of aspects of content presentation in a user interface of a portal (e.g., a website) provided by a server for use by other computing devices in remotely accessing services provided by that server. More specifically, in a configuration environment for specifying parameters of a test, a first prompt requesting provision of specific parameters of an A/B test is visually presented. From first responses received to the first prompt, a list of possible combinations of variations in content presentation to test is automatically generated and visually presented as part of a second prompt to select some or all of the possible combinations for testing. The second responses to the second prompt are then used to automatically generate interaction data to be employed in controlling the server in performing the A/B test.

In the first prompt, one or more visual areas of the visual portion of a user interface (e.g., header, footer, navigation area, etc.) may be selected for inclusion in the test, as well as what aspects of content presentation in those visual areas are to be tested with different variations. The first prompt may further provide mechanisms for specifying one or more additional parameters of the test, including and not limited to specifying the number of rounds of the test, specifying a range of times and/or dates during which the test is to be conducted, specifying one or more types of user behavior for which statistical data is to be captured, specifying aspects of the statistical analysis to be employed in analyzing results, etc.

With the visual areas and aspects of content presentation to be tested selected via the first prompt, a list of some or all of the possible combinations of variations in those aspects of content presentation is visually presented in the second prompt. This list is provided in a tabular format in which each combination of variations in content presentation is given an entry. Each entry describes its corresponding combination of variations and provides mechanisms for selecting whether that entry's combination of variations is to be included in the test, or not. By way of example, each entry may include mechanisms to enable one or more of removing the entry from the table, selecting or de-selecting the entry's combination for inclusion in the test, designating the entry's combination as a control, specifying what percentage of participants will be randomly selected and tested with the entry's combination, and/or selecting the round of the test in which the entry's combination will be used.

Using the responses to the second prompt, interaction data is automatically generated for use in controlling what versions of a user interface associated with the test are presented by a server. In some embodiments, this interaction data may be provided directly to the server that presents the user interface for use by that server in performing the test. In other embodiments, the interaction data is provided to a control device that communicates with and controls what versions of the user interface are presented by the server during performance of the test.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a test system 1000 incorporating one or more of a configuration device 100, a server 400, a control device 500, and interaction devices 800a, 800b and 800c. Each of these computing devices 100, 400, 500 and 800a-c may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

As depicted, at least some of these computing devices 100, 400, 500 and 800a-c exchange signals concerning a user interface for a portal (e.g., a website) through which services provided by the server 400 are accessed via one or more of the interaction devices 800a-c. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

During normal operation of the server 400 (e.g., at times when no test of differing versions of a user interface is underway), one or more of the interaction devices 800a-c is operated by a user to access services provided by the server 400. Such services may include and are not limited to one or more of online product sales, Internet-based audio or video on demand, online encyclopedia, email services, file sharing services, online teleconferencing and/or videoconferencing services, news, financial transaction services, etc. The server 400 instantiates a portal for each interaction device accessing it to segregate its communications with each such interaction device from its communications with the others. With such a portal, the server 400 provides a user interface to make accessing and using the provided services easier. The instantiation of webpages of a website for each interaction device accessing services through the website is an example of the provision of such a portal with such a user interface.

To better enable the provision of such a user interface in a manner that eases the task of making alterations to it over time, the user interface is often at least partly defined in an interaction data and an interaction script. The interaction script is interpreted by a script interpreter executed by a processor circuit of the server 400 that provides that user interface. Examples of languages in which such interaction script may be written include and are not limited to JavaScript™, PHP and Python. The interaction data often includes indications of what content is to be presented and/or where to obtain the content from, and/or indications of how the content is to be presented (e.g., where on a display, in what format, etc.). The interaction data may include a description of aspects of that user interface described in a markup language such as HTML or XML.

The same server transmits another interaction data to an interaction device operated by a user to access the server. That interaction data includes indications of what content is to be presented on the display of that interaction device, in what manner, etc., for whatever is being specifically viewed on that display of that interaction device at that time. More specifically, among the information that may be contained within these pieces of interaction data are definitions of visible areas of the user interface that are visually presented on a display, and in which various pieces of content are visually presented (e.g., a header, a footer, a navigation area, an area in which an organization's logo is displayed, etc.). Such content may include and is not limited to an organization's contact information, product lists and/or descriptions, descriptions of services, lists of downloadable files, various pieces of text and/or graphics, etc. Also, various aspects of the manner in which that content is presented in each of the visible areas may also defined.

Additionally, such pieces of interaction data may various virtual controls, including and not limited to, "scroll bars", "radio buttons", "check boxes", "drop-down menus", text entry boxes, "slider" controls, "arrow buttons", "clickable links" and numerous other virtually created controls as will be recognizable to those skilled in the art. Such virtual controls are defined to be operable to cause a defined action to occur in response to being selected via a pointing device, including and not limited to, a mouse, a stylus, a touchpad, a touch sensor overlain on the display, etc. In this way, a mechanism of user input made up of multiple controls can be defined in virtual form such that the need to provide physical controls (e.g., buttons, knobs, switches, levers, etc.) as a mechanism of user input may be precluded. Such virtual controls are advantageously easier to alter through editing of an interaction data, rather than through physical alteration of physical controls.

Figure 2:
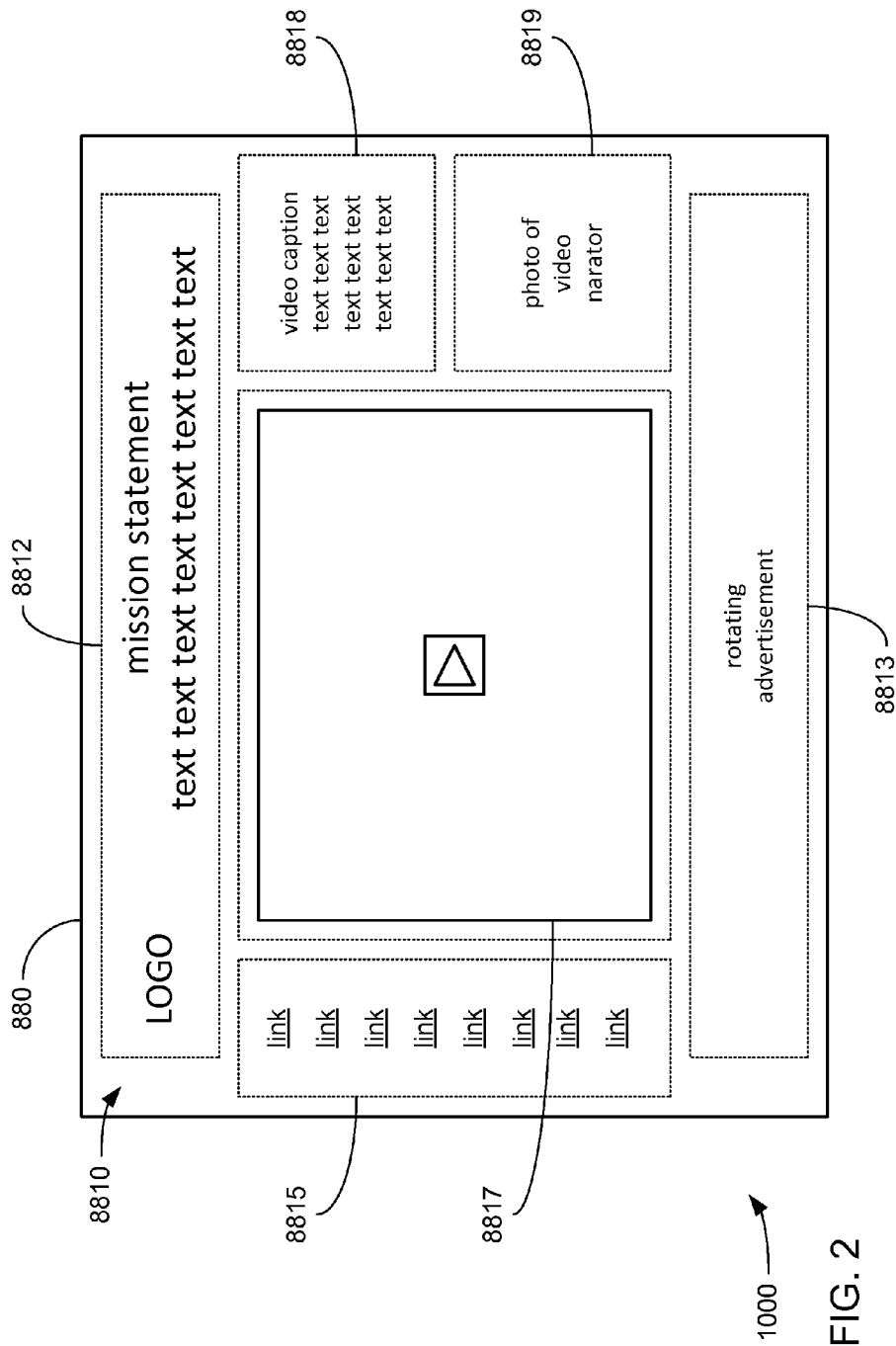
FIG. 2 illustrates an example a visual portion of a user interface provided by the first embodiment.

Turning briefly to FIG. 2, an example is depicted of a visible portion 8810 (e.g., a webpage) of a user interface that may be provided by the server 400 for visual presentation on a display 880 of one of the interaction device 800a-c. As depicted, the visible portion 8810 is divided into various visible areas, specifically, a header 8812, a footer 8813, a navigation area 8815, a video content area 8817, a text content area 8818, and an image content area 8819. As has been discussed, these visible areas may be defined in an interaction script. As also depicted, image content providing an organization's logo and text content providing the organization's "mission statement" are presented in the header 8812, rotating advertisements are presented in the footer 8813, various links operable by way of being selected to cause visual presentation of one of various other visible portions (e.g., a different webpage) are presented in the navigation area 8815, video content with a virtual control to commence playing is presented in the video content area 8817, text content of a caption associated with the video content is presented in the text content area 8818, and photo image content depicting the narrator of the video content is presented in the image content area 8819. Further, aspects of the presentation of content in each of these visible areas is also defined in an interaction script, including and not limited to, font size, font style, whether content is rotated, pixel depth of image or video pixels, etc. The pieces of content to be presented in each of these visible areas 8812, 8813, 8815, 8817, 8818 and 8819 are likely stored in a separate content data (possibly within an interaction data provided to an interaction device), although at least some of the content may be embedded amongst the interaction script. It should be noted that although the visible portion 8810 is depicted as fitting entirely within the viewable area of the display 880, depending on the number and size of the visible areas relative to the size and resolution of any particular display 880, it is entirely possible for the visible portion 8810 to not be able to fit within the viewable area of the display 880 such that some form of panning and/or scrolling must be implemented (possibly with the use of virtual controls such as horizontal and/or vertical scroll bars) to enable visual access to the entirety of the visible portion 8810.

Returning to FIG. 1, the server 400 may be operated to forego normal provision of a user interface for use in providing services in favor of a random provision of different versions of a user interface to different interaction devices (e.g., different ones of the interaction devices 800a-c) as part of performing a test of proposed alterations to the presentation of content in one or more visible areas. In preparation for such testing, the configuration device 100 provides an entry environment enabling an operator of the configuration device 100 to enter details of an A/B test to be performed concerning one or more proposed changes to content presentation in a user interface provided by the server 400 to users of one or more of the interaction devices 800a-c in accessing the server 400 therefrom to make use of services provided by the server 400. The configuration device 100 visually presents multiple visual prompts on a display 180 of the configuration device 100 by which an operator is prompted to respond by providing various parameters of the test. The responses to at least one visual prompt leads to the automatic generation of a list of combinations of variations in content presentation that may be tested, and to the presentation of that list in another visual prompt by which the operator is prompted to respond by modifying one or more entries of that list. Based on those responses, an interaction data is generated based on the combinations of variations in content presentation selected for testing in response to the prompts. That interaction data may then either be directly provided to the server 400 to be used as an input by the server 400 in providing different versions of the user interface, or that interaction data may be provided to the control device 500 to be used by it in communications with the server 400 to cause the provisions of different versions of the user interface. Either way, these different versions of the user interface are randomly selected and provided to different ones of the interaction devices 800a-c as part of the server 400 performing the test.

Regardless of whether the control device 500 communicates portions of an interaction data received from the configuration device to control the performance of a test by the server 400, the control device 500 monitors the progress of the test, recording various metrics of behavior of users who are presented with the different versions of the user interface selected for testing. The metrics are analyzed by the monitoring device 500 to derive results of the test, and thereby determine whether the proposed new variations in content presentation bring about a desired change in the actions of users. Such desired actions may include one or more of purchasing more products, "clicking thru" more advertisements, exploring more webpages of a website, reducing "bouncing" (e.g., where a user accesses a webpage, but then leaves it relatively quickly, rather than lingering there), downloading more files, sharing more information about themselves that may be used in marketing efforts, etc.

Each of the interaction devices 800a-c is a computing device operated by one or more users to access whatever services may be provided by the server 400 via the user interface provided by the server 400 that is the subject of the test. Each of the interaction devices 800a-c includes a display 880 by which a visible portion of that user interface is visually presented to those users, but with the variations of content presentation that have been selected for testing during performance of the test.

In various embodiments, the configuration device 100 incorporates a storage 160 storing a control routine 140 and an interaction data 134, a processor circuit 150, controls 120, the display 180, and an interface 190 coupling the configuration device 100 to the network 999. In executing a sequence of instructions of at least the control routine 140, the processor circuit 150 is caused to display the aforedescribed prompts for parameters for a test on the display 180 and to await the aforedescribed responses conveying those parameters via signals received from the controls 120. Upon at least receipt of sufficient parameters, the processor circuit 150 is caused to generate the interaction data 134. Upon generation of the interaction data 134, the processor circuit 150 may be further caused to transmit the interaction data 134 to the control device 500 to be used in controlling performance of the tests defined therein by the server 400.

In various embodiments, the server 400 incorporates a storage 460 storing a control routine 440, an interaction script 435, an interaction data 434, a content data 433 and interaction data 438a-c; a processor circuit 450; and an interface 490 coupling the server 400 to the network 999. In executing a sequence of instructions of at least the control routine 440, the processor circuit 450 is caused to receive signals from one or more of the interaction devices 800a-c conveying requests from their users for access to services provided by the server 400. In response, the processor circuit 450 is caused to interpret interaction script 435 to provide one or more versions of a user interface. During normal operation of the server 400, the server simply provides a version of the user interface as defined by a combination of the interaction script 435 and the interaction data 434. However, during operation of the server 400 to perform tests of different versions of the user interface, the server 400 is directed by a combination of the interaction script 435 and portions of the interaction data 134 received from the control device 500 to provide randomly selected versions of the user interface to each of the interaction devices 800a-c in which content drawn from the content data 433 is visually presented in one or more visual areas in varying ways selected for inclusion in the test. In so doing, the processor circuit 450 is caused to transmit corresponding ones of the interaction data 438a-c to the interaction devices 800a-c, each of the interaction data 438a-c made up of content to be visually and/or indications of the manner in which that content is to be presented by the interaction devices 800a-c.

In various embodiments, the control device 500 incorporates a storage 560 storing a control routine 540, a statistics data 534, a results data 535 and a database 533 to which the interaction data 134 may be added; a processor circuit 550; and an interface 590 coupling the monitoring device 500 to the network 999. In executing a sequence of instructions of at least the control routine 540, the processor circuit 550 may be caused to receive the interaction data 134 from the configuration device 100, and to add the interaction data 134 to the database 533 of various definitions of variations of user interface for the server 400 to be directed by the control device 500 to test. The control device 500 may then further communicate with the server 400 via the network 999 to transmit portions of the interaction data 134 to cause the server 400 to perform tests of the versions of the user interface defined within the interaction data 134. As the server 400 performs these tests, the processor circuit 550 is caused to operate the interface 590 to receive signals conveying metrics indicative of aspects of user behavior in being presented with the different randomly selected versions of the user interface, and/or aspects of user behavior in making use of services provided by the server 400 through each of those versions of the user interface. Such received metrics are stored by the processor circuit 550 as the statistics data 534, and are subsequently statistically analyzed by the processor circuit 550, the results of which are stored as the results data 535.

In various embodiments, each of the interaction devices 800a-c incorporates a storage 860 storing a control routine 840, one of the interaction data 438a-c and possibly one of persistent data 435a-c; a processor circuit 850; controls 820; the display 880; and an interface 890 coupling each of the interaction devices 800a-c to the network 999. In executing a sequence of instructions of at least the control routine 840, the processor circuit 850 of each of the presentation devices 800a-c is caused to receive signals from the server 400 conveying a corresponding one of the interaction data 438a-c made up of content to be visually presented and/or indications of the manner in which that content is to be presented in one of the varying ways that corresponds to one of the versions of user interface selected for the test. Which of the interaction devices 800a-c is caused to present which of those versions of the user interface is randomly selected by the server 400. In some embodiments, each of the interaction devices 800a-c may be caused to present a randomly selected version of the user interface each time they are operated to access the server 400 to make use of services provided by the server 400.

However, in other embodiments, it may be deemed desirable to provide a consistent user experience each time a particular one of the interaction devices 800a-c is operated to access the server 400, at least for the duration of the test or for the duration of a round of the test. In such other embodiments, the server 400 may transmit one of a persistent data 435a-c (e.g., a so-called "cookie") to corresponding ones of the interaction devices 800a-c the first time that each is operated to access the server 400 during the course of the test or during the course of a round of the test. Each one of the persistent data 435a-c includes an indication of which version of the user interface was initially randomly selected to be visually presented by its corresponding one of the interaction devices 800a-c when each was first operated to access the server 400 during the test or during a particular round of the test. Alternatively, the server 400 may store identifying information from each of the interaction devices 800a-c along with an indication of what version of the user interface was last presented to each in order to enable the server 400 to provide those same versions to each of the interaction devices 800a-c during a subsequent access. Thus, for the duration of the test or for the duration of a particular round of the test, the same randomly chosen version of the user interface is consistently presented on the display 880 each time each of the interaction devices 800a-c is operated to access the server 400. When the test ends, the persistent data 435a-c may be erased from the storage 860 of each of the interaction devices 800a-c, and all of the interaction devices 800a-c may be caused to visually present the same version of the user interface, which may be the original version in use before the test, or may be a new version selected for use based on the results of the test.

It should be noted that although only three interaction devices 800a-c are depicted for sake of simplicity in depiction and discussion herein, it is envisioned that the server 400 would provide services to a relatively large number of interaction devices (and thereby, to a relatively large number of users). Indeed, those familiar with A/B test methodologies will readily recognize that larger numbers of participants is desirable. As will be explained in greater detail, percentages of participants to be randomly selected to experience each of the different versions of the user interface are specified as part of the test parameters indicated in the interaction data 134, making it desirable to have a large enough set of participants that each version the user interface is able to be tried with enough participants to ensure the collection of statistically valid data.

In various embodiments, each of the processor circuits 150, 450, 550 and 850 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 460, 560 and 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 490, 590 and 890 employ any of a wide variety of signaling technologies enabling each of computing devices 100, 400, 500 and 800, respectively, to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 450, 550 and 850 (e.g., to implement a protocol stack or other features). Where one or more portions of the network 999 employs electrically and/or optically conductive cabling, one or more of these interfaces may employ signaling and/or protocols conforming to any of a variety of industry standards, including without limitation, RS-232C, µS-422, USB, Ethernet (IEEE-802.3) or IEEE-1394. Alternatively or additionally, where one or more portions of the network 999 entails the use of wireless signal transmission, one or more of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 490, 590 and 890 are depicted as a single block, one or more of these may comprise multiple interfaces that may be based on differing signaling technologies. This may be the case especially where one or more of these interfaces couples corresponding ones of the computing devices 100, 400, 500 and 800 to more than one network, each employing differing communications technologies.

In various embodiments, each of the controls 120 and 820 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of these controls may comprise manually-operable controls disposed upon a casing of corresponding ones of the computing devices 100 and 800, and/or may comprise manually-operable controls disposed on a separate casing of a physically separate component of corresponding ones of these computing devices (e.g., a remote control coupled to other components via infrared signaling). Alternatively or additionally, each of these controls may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 180 and 880 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 200 and 800, or may be disposed on a separate casing of a physically separate component of corresponding ones of these computing devices (e.g., a flat panel monitor coupled to other components via cabling).

Figure 3:
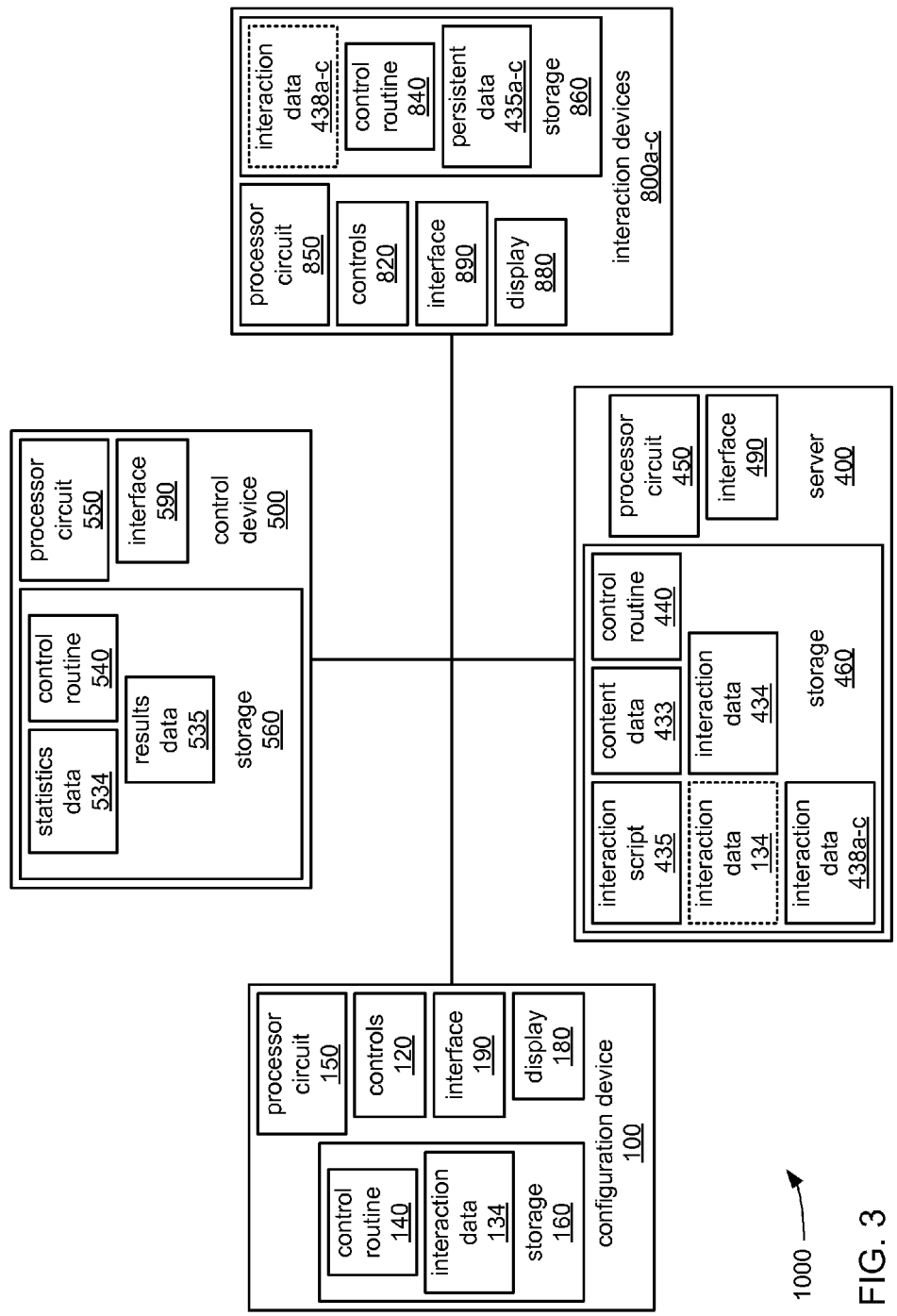
FIG. 3 illustrates a variant of the first embodiment.

FIG. 3 illustrates a block diagram of a variant of the test system 1000 of FIG. 1, this variant again incorporating one or more of the configuration device 100, the server 400, the control device 500, and interaction devices 800*a*, 800*b* and 800*c*. Indeed, many of the components of the two variants of the test system 1000 of FIGS. 1 and 2 are substantially the same and perform substantially the same functions in substantially the same ways. In recognition of this, and for sake of simplicity in comparison and discussion, like components are given identical reference numbers across these two variants.

However, one substantial difference between the variants of the test system 1000 of FIGS. 1 and 3 lies in the provision of the interaction data 134 directly to the server 400 in the variant of FIG. 3, rather than via the control device 400 in the variant of FIG. 1. In other words, in the variant of FIG. 3, the server 400 operates with great autonomy in performing the tests, randomly providing the various variants of the user interface as indicated in the interaction data 134, which supplants the interaction data 434 normally used by the server 400 during normal operation. Despite this greater autonomy, the control device 500 still monitors the performance of the test by the server 400, and still collections metrics of the manner in which users respond to the various versions of the user interface to which they are exposed during the test, and continues to store those metrics as the statistics data 534 within the storage 560 for subsequent processing to derive the results data 535.

FIGS. 4, 5, 6 and 7, taken together, illustrate portions of the block diagrams of the variants of either FIG. 1 or FIG. 3 in greater detail. More specifically, aspects of the operating environments of the computing devices 100, 400, 500 and 800a-c are depicted, in which corresponding ones of the processor circuits 150, 450, 550 and 850 are caused by execution of respective control routines 140, 440, 540 and 840 to perform the aforedescribed functions. As will be recognized by those skilled in the art, each of these control routines, including the components of which each is composed, implement logic as a sequence of instructions and are selected to be operative on (e.g., executable by) whatever type of processor or processors are selected to implement each of these processor circuits. Further, it is important to note that despite the depiction in these figures of specific allocations of implementation of logic between hardware and software components and routines made up of instructions, different allocations are possible in other embodiments.

In various embodiments, one or more of the control routines 140, 440, 540 and 840 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 450, 550 and 850, including without limitation, Windows™, OS X™, Linux®, Android OS™, Symbian™, Blackberry® OS, iOS™ and ThreadX®. Where one or more device drivers are included, those device drivers may provide support for any of a variety of other components, whether hardware or software components, that comprise one or more of the computing devices 100, 400, 500 and 800a-c.

Each of the control routines 140, 440, 540 and 840 comprises a communications component 149, 449, 549 and 849, respectively, executable by corresponding ones of the processor circuits 150, 450, 550 and 850 to operate corresponding ones of the interfaces 190, 490, 590 and 890 to transmit and receive signals, possibly via the network 999 as has been described. As will be recognized by those skilled in the art, each of these communications components are selected to be operable with whatever type of interface technology is selected to implement each of the corresponding ones of these interfaces.

Figure 4:
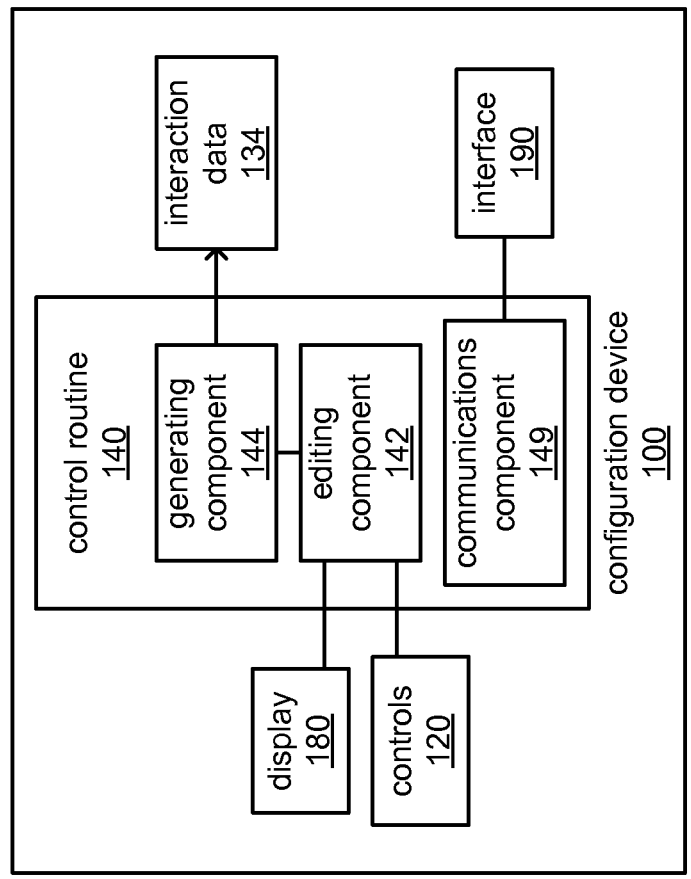
FIGS. 4, 5, 6 and 7 illustrate portions of the embodiment of FIG. 1.

Turning more specifically to FIG. 4, the control routine 140 includes an editing component 142 executable by the processor circuit 150 to interact with one or both of the controls 120 and the display 180 to visually present prompts requesting parameters for a test and to receive responses to those prompts. The editing component 142 uses responses to a first visual prompt to generate a list of some or all possible combinations of variations in content presentation for a test that is presented in a second visual prompt. The control routine 140 also includes a generating component 144 to generate the interaction data 134 that enables the server 400 to implement the different versions of the user interface to be tested, each version implementing one of the combinations of variations in content presentation selected for the test. In providing the prompts and generating the interaction data 134, the editing component may employ a copy of the interaction data 434 received by the configuration device 100 from the server 400 to obtain information concerning the current version of the user interface normally provided by the server 400 during normal operation, including currently defined visual areas, aspects of the content normally presented within them, and aspects of the normally manner in which that content is presented.

As has been discussed, the interaction data 134 may be directly provided to the server 400 to at least temporarily supplant the interaction data 434 that the server 400 normally uses to control presentation of a single version of the user interface in favor of randomly presenting different versions as has been described. Alternatively, as has also been discussed, the interaction data 134 may be provided to the control device 500 to enable it to direct the performance of the test by the server 400, possibly via the network 999.

Figure 5:
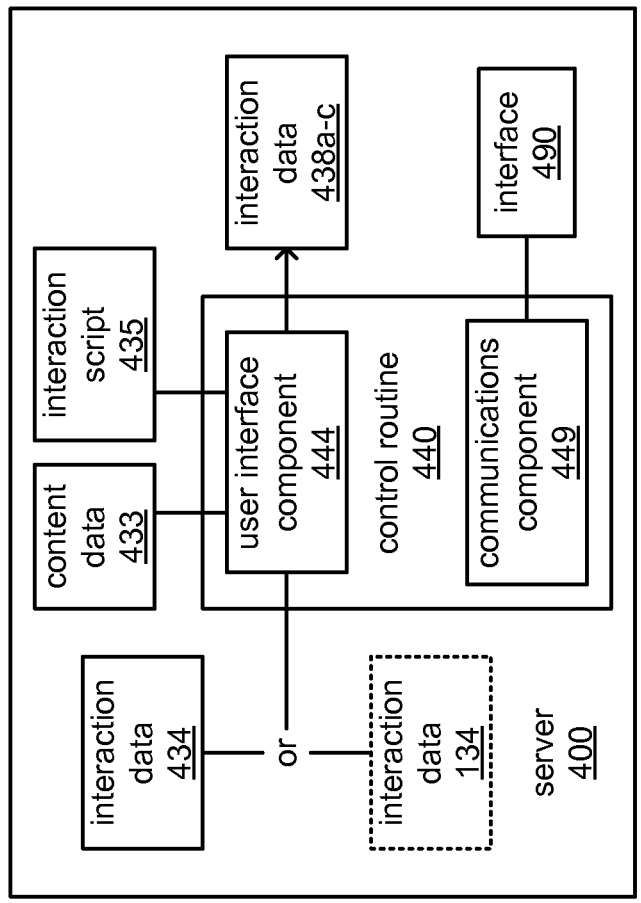

Turning to FIG. 5, the control routine 440 includes a user interface component 444 executable by the processor circuit 450 to employ one or the other of the interaction data 134 and 434, along with the interaction script 435 and the content data 433 to provide either a single version of a user interface to all of the interaction devices 800a-c during normal operation or to provide different randomly selected versions of the user interface to each of the interaction devices 800a-c as part of performing a test. However, as has also been described, it may be deemed desirable to avoid making a new random selection of one of the versions of the user interface each time the same one of the interaction devices 800a-c is operated to access the server 400 during performance of a test. Thus, as has been discussed, on the first occasion in which each of the interaction devices 800a-c is operated to access the server 400 while the server 400 is performing the test, a corresponding one of the persistent data 435a-c may be provided to each of the interaction devices 800a-c to be stored thereon and used to provide an indication during subsequent accesses to the server 400 of which one of the versions of the user interface was initially randomly selected to enable continued use of that version during the course of the test (or at least during the course of a current round of the test). Alternatively, as has also been discussed, the server 400 may maintain indications of the identities of each of the interaction devices 800a-c correlated with which version of the user interface was last provided to each.

As has been described, as part of providing whatever version of a user interface to each of the interaction devices 800a-c (either as part of performing the test, or during normal operation in which no test is underway), the server 400 transmits a corresponding one of the interaction data 438a-c to each of the interaction devices 800a-c. The interaction data 438a-c includes one or both of content to be visually displayed in one or more visual areas of a visible portion of a user interface, and indications of the manner in which that content is to be presented within them.

Figure 6:
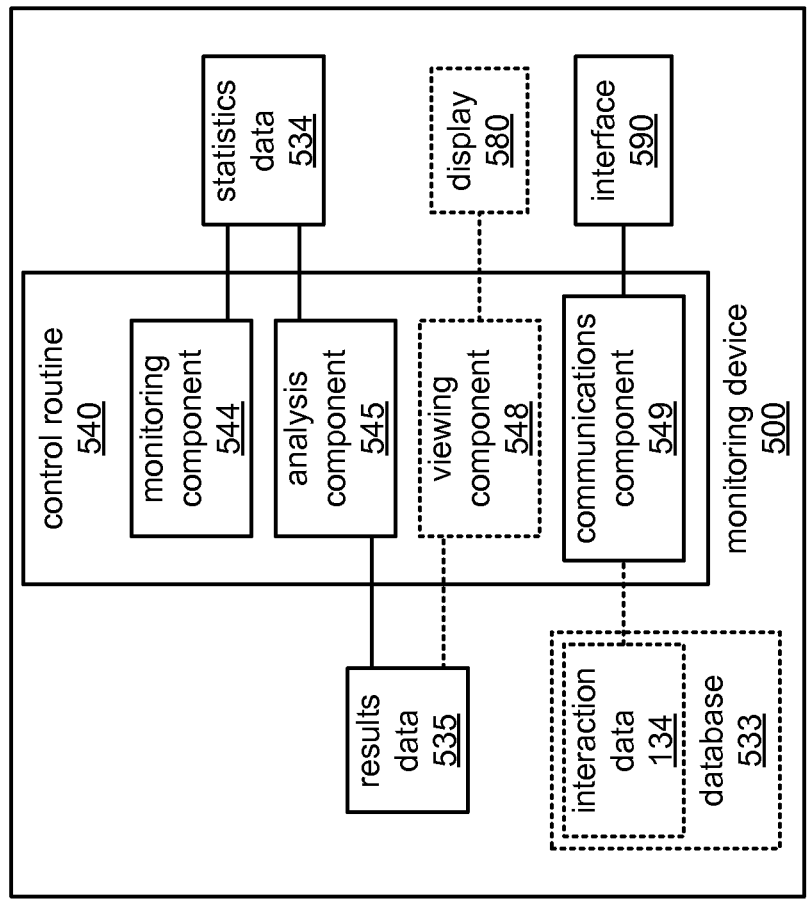

Turning more specifically to FIG. 6, the control routine 540 includes a monitoring component 544 executable by the processor circuit 550 to receive and store metrics of user behavior observed in response to each of the versions of user interface provided by the server 400 during performance of the test by the server 400 as the statistics data 534. As has been discussed, the metrics may represent indications of instances of any of a variety of user behaviors selected to be monitored, including and not limited to, viewing time spent at a given webpage or other visual presentation of content, bounces in which a user visits a webpage or other visual presentation of a portal only briefly, instances of "clicking through" a visual presentation of an advertisement, frequency of use of a service provided by the server 400, etc. The control routine 540 also includes an analysis component 545 to parse the statistics data 534 to analyze the received metrics stored therein to determine the degree of success of one or more versions of the user interface in bringing about a desired behavior on the part of users, and storing the results of the analysis as the results data 535. In some embodiments, the control routine 540 may further include a viewing component 548 executable by the processor circuit 550 to visually present the results data 535 on a display 580 of the monitoring device 500, possibly in graphical form.

Further, the communications component 549 may be employed to receive the interaction data 134 for storage within the database 533 (among other pieces of interaction data defining other tests). The communications component 549 may then provide portions of the interaction data 134 to the server 400 as needed by the server 400 to provide different versions of a user interface to different ones of the interaction devices 800a-c as part of performing a test.

Figure 7:
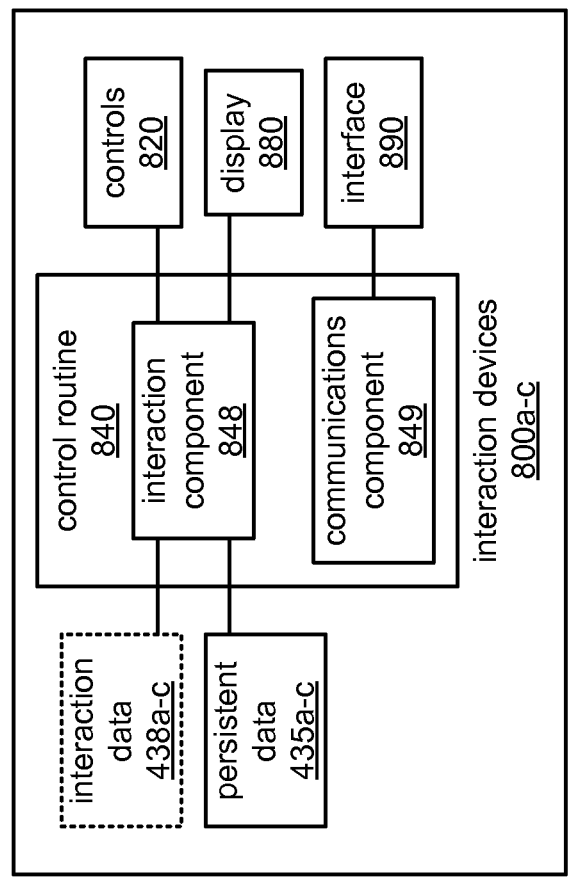

Turning more specifically to FIG. 7, the control routine 840 comprises an interaction component 848 executable by the processor circuit 840 to interact with one or both of the controls 820 and the display 880 to visually present the viewable portion of whatever version of user interface is provided by the server 400. As has been discussed, each of the interaction devices 800a-c receives a corresponding one of the interaction data 438a-c made up of one or both of content to visually presented in the viewable portion of the user interface on the display 880, and indications of definitions of one or more visual areas of that viewable portion of the user interface in which to present that content, as well as aspects of the manner in which that content is to be presented in the one or more visual areas.

As has been previously discussed, in some embodiments, one or more of the interaction devices 800a-c may also receive a corresponding one of the persistent data 435a-c from the server 400 indicating which of the versions of the user interface selected for the test has been randomly selected for the one of the interaction devices 800a-c in which that corresponding one of the persistent data 435a-c is stored. In such embodiments, the processor circuit 850 is caused to transmit an indication of the randomly selected version of user interface indicated in its corresponding one of the persistent data 435a-c to the server 400 when operated to access the server 400 to cause the server 400 to continue to provide that same version of the user interface for as long as the test (or a specific round of the test) continues to be performed by the server 400.

Figure 8A:
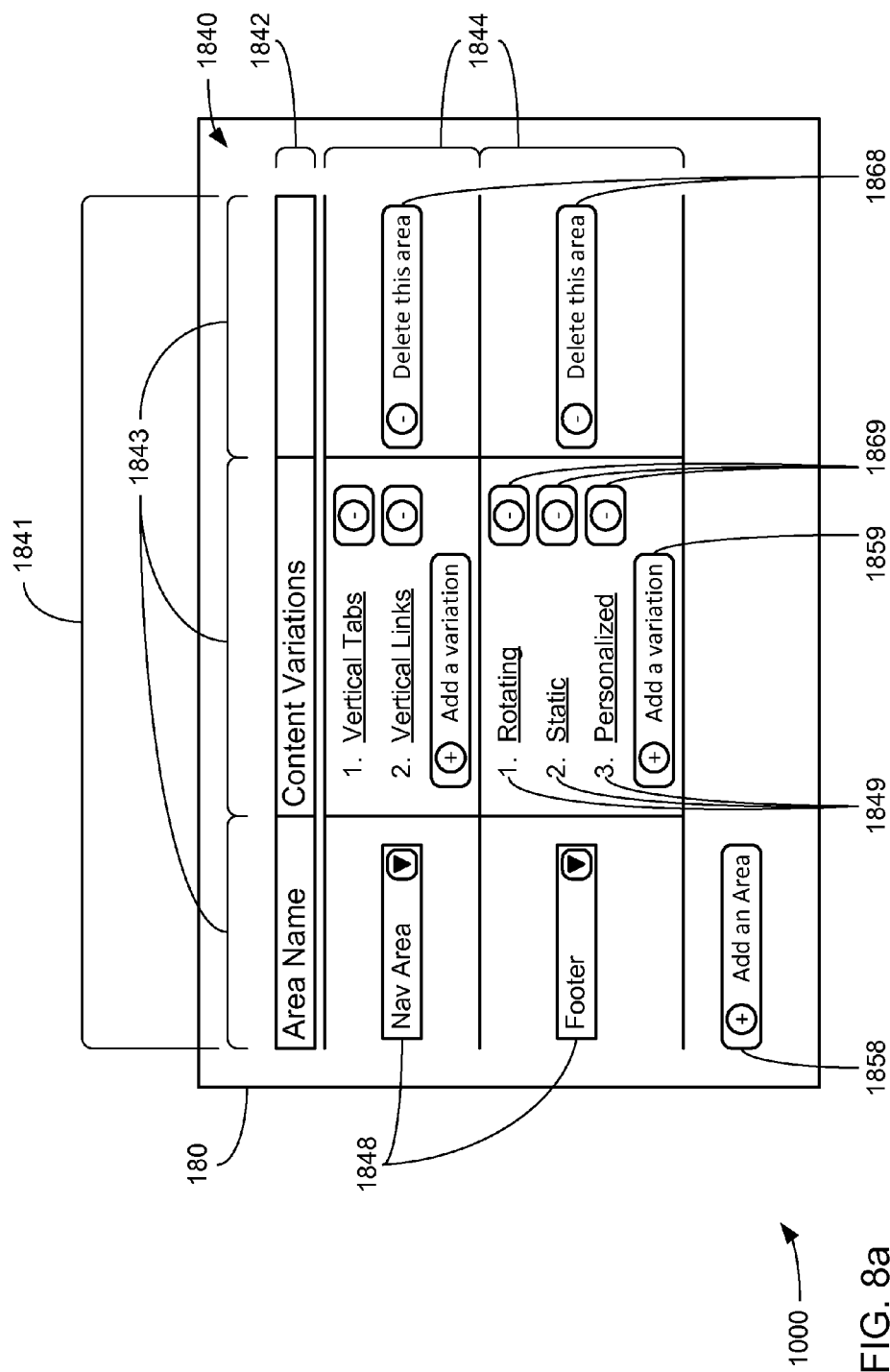
FIGS. 8a and 8b illustrate an example of a configuration environment visually presented by the first embodiment.
Figure 8B:
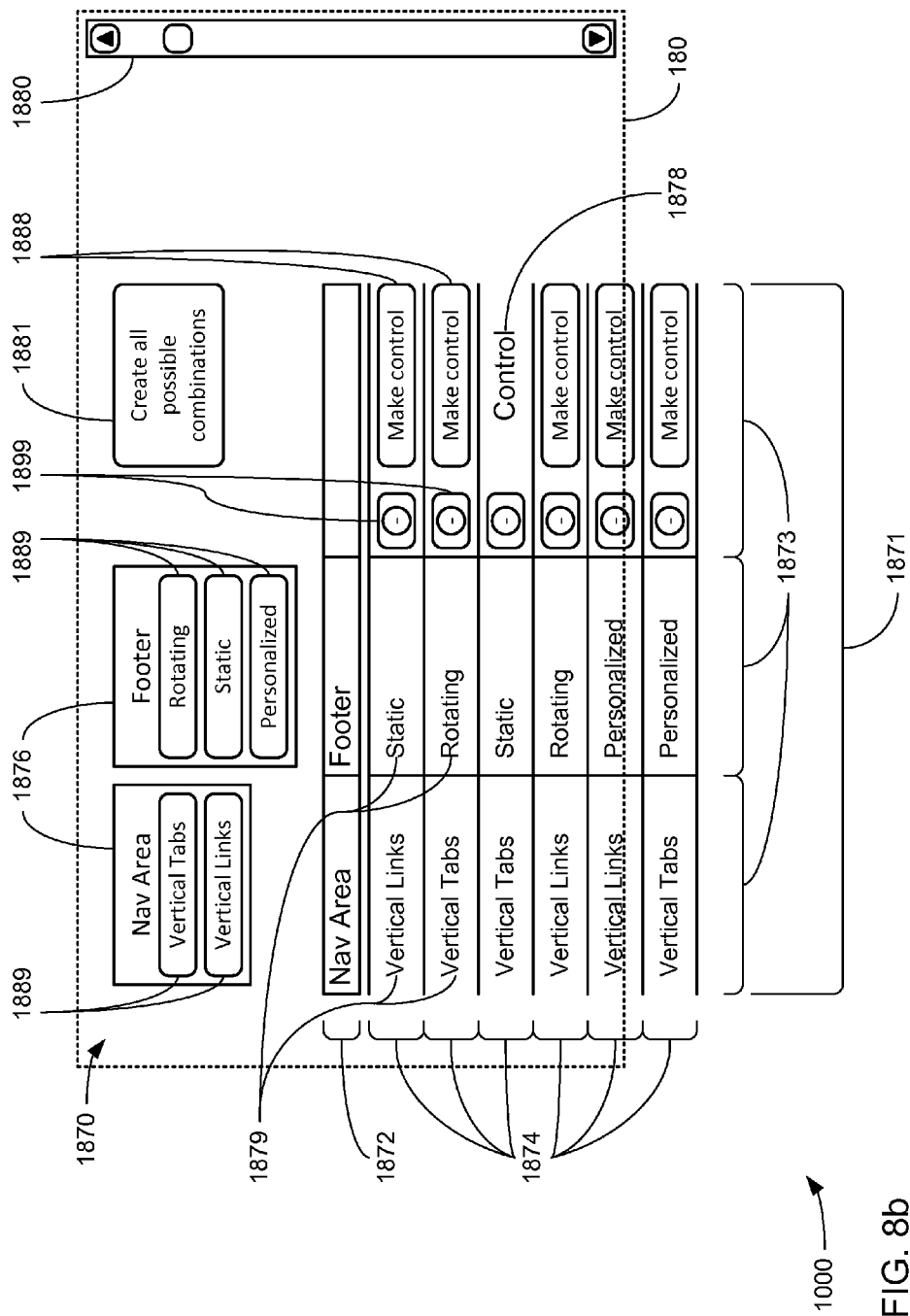

Turning briefly to FIGS. 8a and 8b, an example is depicted of visual prompts 1840 and 1870 presented as portions of a configuration environment provided by the configuration device 100 on the display 180 to request provision of parameters to configure an A/B test to be performed by the server 400 and monitored by the monitoring device 500. In each of the visual prompts 1840 and 1870, parameters of the test that have already been provided are visually presented in tabular form, namely table 1841 in prompt 1840 and table 1871 and prompt 1870.

In prompt 1840, the table 1841 is organized into rows 1844 and columns 1843, with the columns 1843 given headings 1842. One of the columns 1843 presents the identifiers 1848 of visual areas that have been selected for inclusion in the test, each identifier 1848 presented in a separate one of the rows 1844. As depicted, each identifier 1848 is selected from a "drop-down" menu that presents a list of available ones of the identifiers 1848 to choose from for each of the rows 1844. It may be that the processor circuit 150 is caused to parse the executable code 434 to identify all of the visual areas of the visible portion of a user interface (e.g., the visible portion 88101810 of the user interface exemplified in FIG. 2), and to thereby create the list of identifiers of visual areas that appears in these drop-down menus. Alternatively, it may be that an operator of this configuration environment is caused to manually enter text to name visual areas by their identifiers in text entry boxes, rather than to selected identifiers from drop-down menus.

In another of the columns 1843 in each of the rows 1844 corresponding to one of the selected identifiers 1848 of a visual area selected for testing one or more variations 1849 of aspects of content presentation that are selected to test are presented. In each of these rows 1844 in this particular one of the columns 1843, button-styled virtual controls 1859 and 1869 are presented that are operable to either add another variation 1849 for testing or to remove a variation 1849 from those selected for testing, respectively. In still another of the columns 1843 in each of the rows 1844 corresponding to one of the selected identifiers 1848 is a button-styled virtual control 1868 operable by selection to delete its corresponding one of the rows 1844, and thereby remove the visual area identified by its selected identifier 1848 from inclusion in the test. In contrast, a button-styled virtual control 1858 is visually presented adjacent to the table 1841, and is operable by selection to add another row 1844 to the table 1841 to enable another visual area to be selected by its identifier 1848 for inclusion in the test.

Thus, in the prompt 1840, an operator of the configuration device 100 is prompted to provide parameters of the test, namely visual areas to be included in the test and aspects of presentation of content in each of those visual areas to be tested. The responses received by the configuration device 100 (possibly through operation of its controls 120) to the prompt 1840 are visually presented in this tabular form (e.g., the table 1841) in a manner that grows the table 1841 as more of those responses are received.

In prompt 1870, the table 1871 is organized into rows 1874 and columns 1873, with the columns 1873 given headings 1872. Each of the rows 1874 presents a combination of variations 1879 of aspects of content protection (one variation for each selected visual area) that may be included in the test. For each row, there are one or more of the columns 1873 that each correspond to one of the visual areas selected by an identifier 1848 in the prompt 1840 for the test. In other words, the selections of visual areas for inclusion in the test made in response to the presentation of the prompt 1840 determine what columns 1873 are presented as part of the table 1871 in the prompt 1870. In each of those columns 1873, one of the variations 1879 of presenting content selected in the prompt 1840 for inclusion for testing in a selected visual area is presented. In other words, the selections of variations of content presentation made in response to the prompt 1840 determine what variations are selectable for testing in that selected visual area in one or more possible combinations of variations presented in each of the rows 1874 in the prompt 1870.

Thus, each of the rows 1874 presents a combination of variations of presenting content in more than one visual area that may be included in the test. An operator of the configuration device 100 selects which combinations of variations of content presentation will be included in the test by selecting what ones of the rows 1874 to add to or delete from the table 1871. In support of making such selections, in still another of the columns 1873 in each of the rows 1874, button-styled virtual controls 1899 are presented that are operable by selection to remove its corresponding one of the rows 1874 from the table 1871. Positioned adjacent the table 1871 are multiple sets 1876 of button-styled virtual controls 1889 that are operable by selection to add more of the rows 1874 to the table 1871. Each of the sets 1876 corresponds to a one of the visual areas selected for inclusion in the test by its identifier 1848 in the prompt 1840 such that what ones of the sets 1876 are visually presented in the prompt 1870 is determined by what visual areas are selected in the prompt 1840. The virtual controls 1889 making up each set 1876 correspond to what variations in content presentation were selected in the prompt 1840 for testing for each of the selected ones of the visual areas.

Stated differently, the selection of the visual areas identified as the "Nav Area" and the "Footer" in response to the prompt 1840 results in the presentation of corresponding ones of the sets 1876 for the same two visual areas, and results in the inclusion of corresponding ones of the columns 1873 for the same two visual areas in the table 1871. Further, the selection of "Vertical Tabs" and "Vertical Links" as variations of content presentation to be tested in the "Nav Area" in response to the prompt 1840 results in the provision of corresponding ones of the virtual controls 1889 for those variations in the set 1876 that corresponds to the "Nav Area" in the prompt 1870. Similarly, the selection of "Rotating", "Static" and "Personalized" as variations of content presentation to be tested in the "Footer" in response to the prompt 1840 results in the provision of corresponding ones of the virtual controls 1889 for those variations in the set 1876 that corresponds to the "Footer" in the prompt 1870. To add another of the rows 1874 to the table 1871, an operator using this example of a configuration environment in operating the configuration device 100 selects one of the virtual controls 1889 in the set 1876 for the "Nav Area" and selects one of the virtual controls 1889 in the set 1876 for the "Footer." A one of the rows 1874 is then added to the table 1871 that includes the selection of variation made in the set 1876 for the "Nav Area" in the column 1873 corresponding to the "Nav Area" and includes the selection of variation made in the set 1876 for the "Footer" in the column 1873 corresponding to the "Footer" in the table 1871.

As an alternative to adding ones of the rows 1874 one at a time through operation of the virtual controls 1889 of the sets 1876 as just described, an operator may alternatively operate a button-styled virtual control 1881 (also located adjacent the table 1871) to cause rows 1874 for every possible combination of variations in content presentation across all of the selected visual areas to be added to the table 1871. Then, the operator may make use of the virtual controls 1899 to remove whichever ones of the rows 1874 specifying combinations of variations that are not desired for inclusion in the test from the table 1871. Thus, not unlike the table 1841 being created and enlarged based on responses to the prompt 1840, the table 1871 is created and grows based on the responses to the prompt 1870. An operator is able to clearly see what is selected for inclusion in the test based on what is shown in each of these tables 1841 and 1871—if a visual area and variation in content presentation are presented as part of these tables, then they are included in the test, and if a visual area or a variation is not presented as part of these tables, then they are not included in the test.

Additionally, presented in each row 1874 of the table 1871 is a button-styled virtual control 1888 to enable an operator of the configuration device 100 to indicate which of the rows 1874 depicts a combination of variations that is deemed to be a control combination (conceivably, there could be more than one) of the test. As those familiar with various types of testing will readily recognize, there may be more than one either a negative control (a combination not expected to produce a sought-after result, and often includes the current combination) or a positive control (a combination that is expected to produce a sought-after result, often as a result of it having shown the sought-after result in previous testing). The inclusion of negative and/or positive controls, especially where the currently used combination of variations in content presentation is used as a negative control, provide an opportunity to compare a current combination with a proposed new combination, and can be used in later statistical analysis to confirm the validity of the test.

It should also be noted that FIGS. 8a and 8b present one example of a solution to addressing the possibility that the entirety of one or the other of the prompts 1840 and 1870 may be made up of too many items to fit within the viewable area of the display 180. More specifically, while FIG. 8a depicts an example of the entirety of the prompt 1840 able to fit within the viewable area of the display 180, FIG. 8b depicts an example of only a subset of the prompt 1870 able to fit with that viewable area. The viewable area of the display 180 has been depicted in dotted lines in FIG. 8b as part of depicting a portion of the table 1871 (e.g., a subpart of the prompt 1870) extending beyond one of the edges of that viewable area. In one exemplary approach to rendering that subpart that is outside the viewable area accessible, a slider-style virtual control 1880 (commonly referred to as a "scroll bar") is depicted as provided along another edge of the viewable area, and is operable to pan or "scroll" about the prompt 1870 to enable viewing of all portions of it.

Upon receipt of the last response to the prompt 1870 selecting combinations for inclusion in the test, the processor circuit 150 is caused to employ the responses to the prompts 1840 and 1870 in generating the interaction script to be interpreted and executed by the server 400 in performing the test. Again, as has been discussed, at least a portion of the interaction script 434 normally interpreted and executed by the server 400 to provide a current version of the user interface is used in generating this new interaction script, at least as a source of identifiers of the visual areas of the visible portion of that user interface. Again, the newly generated interaction script may be generated in a form intended to modify interpretation and execution of the original interaction script 434 (e.g., the augmenting script 134), or may be generated in a form intended be randomly executed as an alternative to the original interaction script 434 (e.g., one or more of the interaction scripts 434x through 434z).

Figure 9:
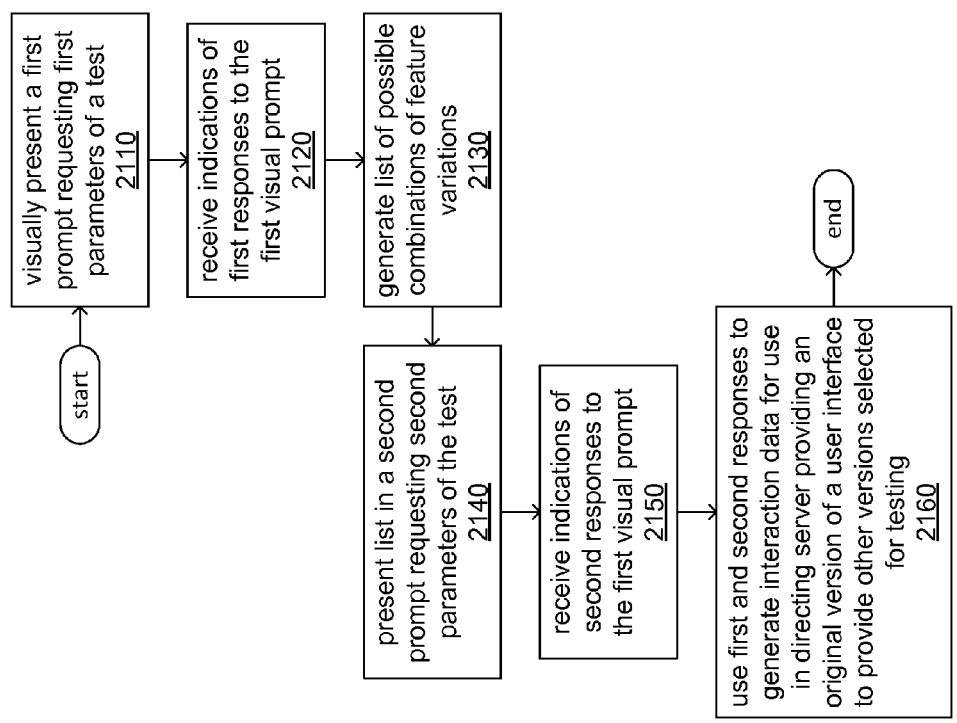
FIG. 9 illustrates an embodiment of a first logic flow.

FIG. 9 illustrates an embodiment of a logic flow 2100. The logic flow 2100 may be representative of some or all of the operations executed by one or more embodiments described herein. More specifically, the logic flow 2100 may illustrate operations performed by components of the configuration device 100, including the processor circuit 150 in executing at least the control routine 140 and/or other components of the configuration device 100.

At 2110, a configuration device (e.g., the configuration device 100) visually presents a first prompt on a display (e.g., the display 180) requesting provision of a first set of parameters of test of versions of a user interface of a portal to services provided by a server (e.g., a website possibly provided by the server 400). As has been discussed, these first parameters may include one or more of number of rounds of the test, specifying a range of times and/or dates during which the test is to be conducted, specifying one or more metrics to be measured, and/or specifying aspects of the statistical analysis to be employed in analyzing results.

At 2120, first responses to the first prompt that convey the first set of parameters are received. At 2130, those first parameters are employed to generate a list of possible combinations of variations of features in one or more visible areas of a visually presented portion of the user interface.

At 2140, the list of possible combinations of feature variations is visually presented on the display in a second prompt requesting provision of a second set of parameters of the test. As has been discussed, the list may be presented in tabular form in which each possible combination of feature variations is presented in a separate entry along with mechanisms to separately specify various aspects of the test related to each combination. Such aspects include, but are not limited to, one or more of removing a combination's entry from the list, selecting or de-selecting a combination for inclusion in the test, designating a combination as a control, specifying what percentage of participants will be tested with each combination, and/or selecting the round of the test in which each combination will be used. At 2150, second responses to the second prompt that convey the second set of parameters are received.

At 2160, the first and second sets of responses are used to generate an interaction data used to control performance of the test by the server, causing the server to provide the user interface in different versions. As part of performing the test, those different versions are randomly selected to be provided to different interaction devices operated by their users to make use of services provided by the server. As has been discussed, a random selection of a version may be made each time a particular interaction device is employed to access the server in some embodiments. However, as has also been discussed, in other embodiments, persistent data may be stored on each interaction device to enable the provision of the same randomly selected version for the duration of the test or the duration of a round of the test, or the server may maintain identifying information for each interaction device correlated with indications of what versions of the user interface were previously presented to each.

Figure 10:
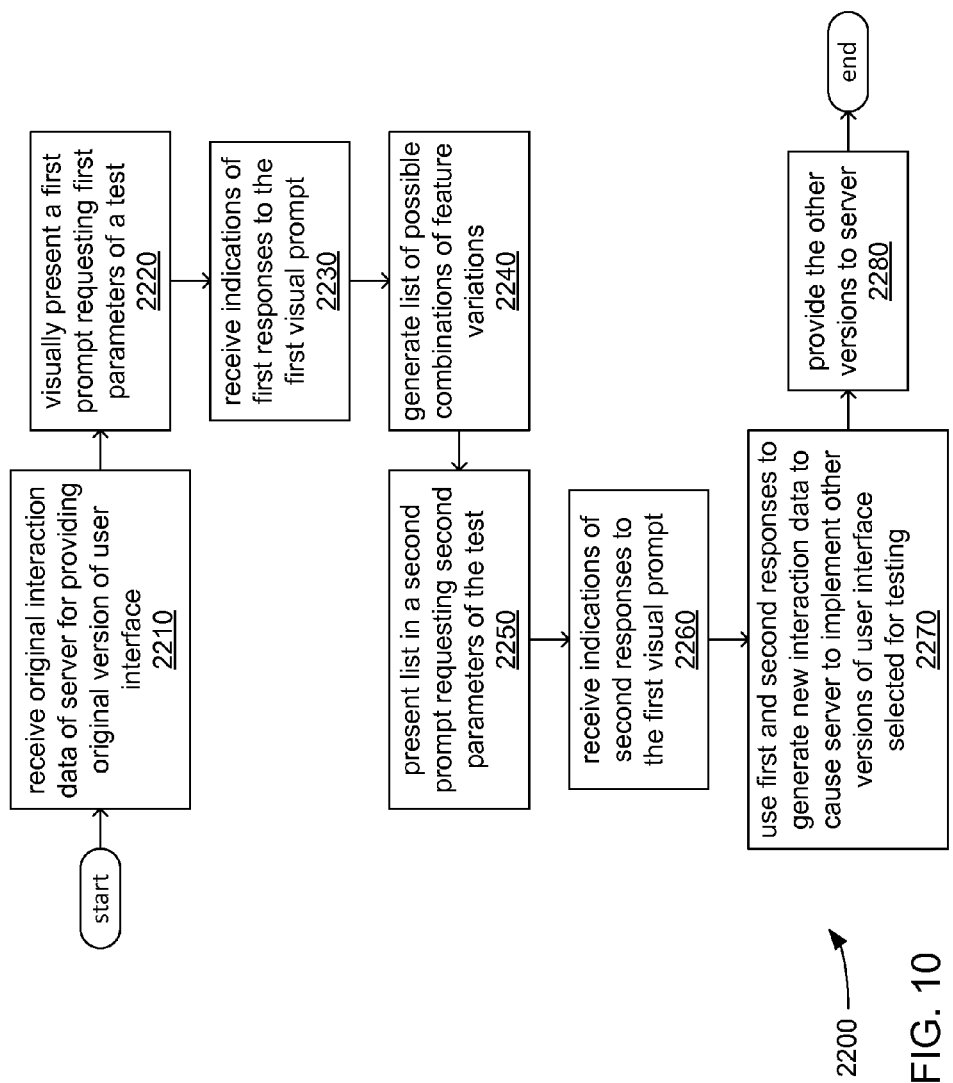
FIG. 10 illustrates an embodiment of a second logic flow.

FIG. 10 illustrates an embodiment of a logic flow 2200. The logic flow 2200 may be representative of some or all of the operations executed by one or more embodiments described herein. More specifically, the logic flow 2200 may illustrate operations performed by components of the configuration device 100, including the processor circuit 150 in executing at least the control routine 140 and/or other components of the configuration device 100.

At 2210, a configuration device (e.g., the configuration device 100) receives a copy of an original version of interaction data used by a server for providing an original version of a user interface to interaction devices operated by users to access services provided by the server through a portal (e.g., a website). As has been discussed, the interaction data provides indications of various user interface characteristics, possibly including one or more of definitions of visual areas, types of content presented within those visual areas and/or the manner in which that content is presented.

From 2220 to 2260, the configuration device generates and visually presents prompts requesting parameters and receives responses thereto in much the same way as just described in the logic flow 2100 of FIG. 9 from 2110 to 2150. The logic flows 2100 and 2200 differ again starting at 2160 and 2270, respectively.

At 2270, the first and second sets of responses are used to generate a new interaction script for controlling the manner in which the server randomly provides different versions of the user interface to different interaction devices accessing the services it provides. At 2280, the new interaction data is provided to the server to cause the server to perform the test. As has been discussed, this may be done directly or through a control device that both controls the performance of the test by the server and monitors user reactions to the different versions of the user interface presented to them.

Figure 11:
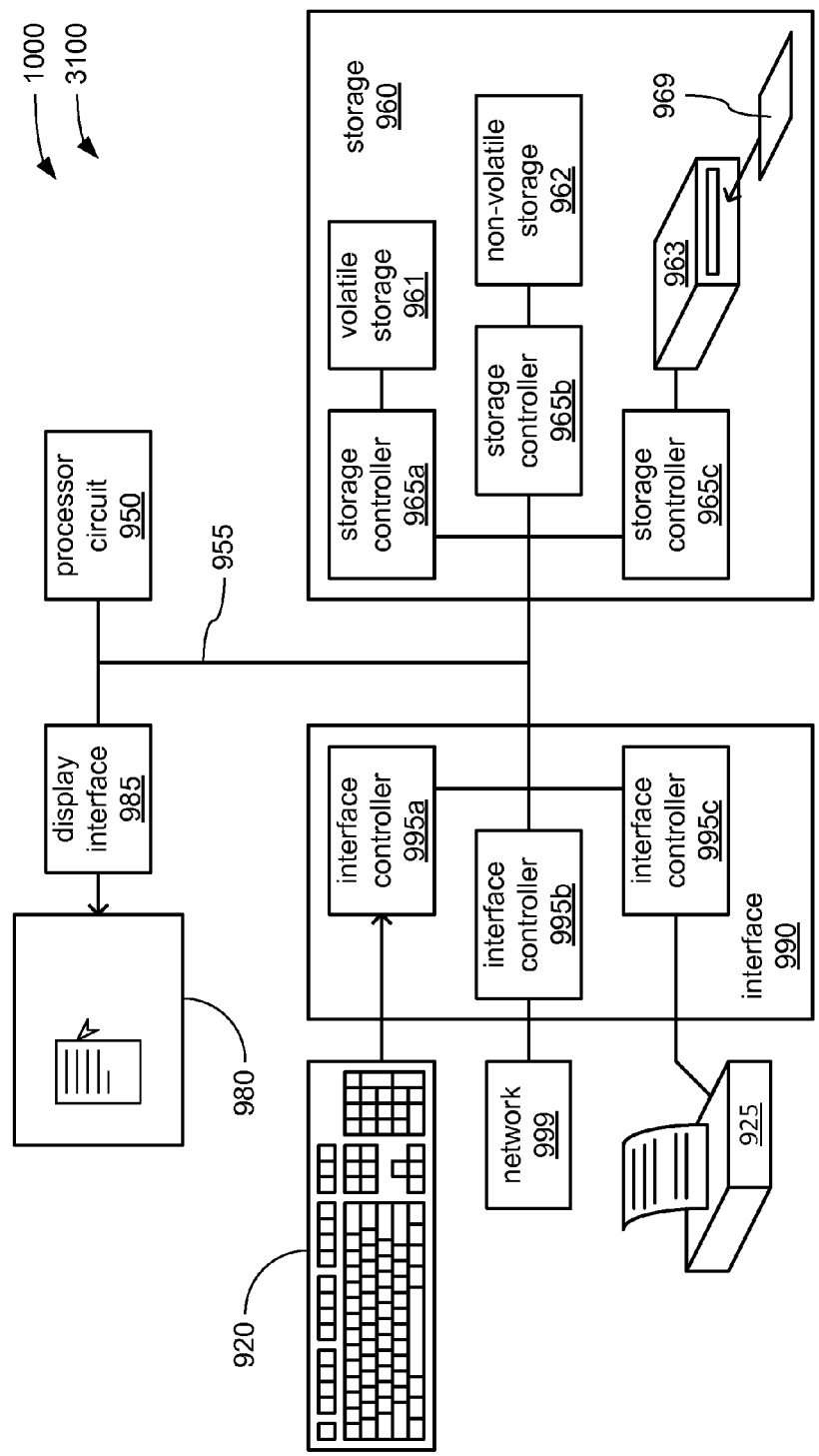
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 400, 500 and 800a-c. It should be noted that components of the processing architecture 3100 are given reference numbers in which the last two digits correspond to the last two digits of reference numbers of components earlier depicted and described as part of each of these computing devices. This is done as an aid to correlating such components of whichever ones of these computing devices may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 400, 500 or 800*a-c* implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 450, 550 or 850) may comprise any of a wide variety of commercially available processors, employing any of a wide variety of technologies and implemented with one or more cores physically combined in any of a number of ways.

As previously discussed, the storage 960 (corresponding to one or more of the storages 160, 460, 560 or 860) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 490, 590 and 890) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920 (perhaps corresponding to one or more of the controls 120 and 820). The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 180 and 880), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100, 400, 500 and 800a-c may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus includes a processor circuit; and logic to visually present a first prompt on a display requesting selection of a first visual area of a user interface, at least one variation of content presentation in the first visual area, a second visual area of the user interface, and at least one variation of content in the second visual area for an A/B test of multiple versions of the user interface, receive a first response to the first prompt indicating selection of the first and second visual areas, at least one variation in content presentation in the first and second visual areas, generate a list of all possible combinations of variations in content presentation in the first and second visual areas based on the first response, and visually present the list as a table in a second prompt on the display requesting selection of at least one of the possible combinations for inclusion in the A/B test.

The above example of an apparatus in which the logic is to identify the first and second visual areas in an interaction data to provide the user interface, and visually present identifiers of the first and second visual areas in the first prompt to enable selection of the first and second visual areas.

Either of the above examples of an apparatus in which the logic is to receive a second response to the second prompt indicating selection of at least one of the possible combinations for inclusion in the A/B test, and visually present the table as altered based on the second response to visually present only the at least one of the possible combinations as selected for inclusion in the A/B test.

Any of the above examples of an apparatus in which the logic is to use a first interaction data that provides the user interface to generate a second interaction data that provides at least one version of the user interface to test the at least one of the possible combinations selected for inclusion in the A/B test.

Any of the above examples of an apparatus in which the logic is to receive the first interaction data via a network from another computing device, and transmit the second interaction data via the network to the other computing device.

Any of the above examples of an apparatus in which the logic is to visually present a virtual control in the second prompt operable to visually present the table, receive a signal indicating selection of the virtual control, and visually present the table in response to the signal.

An example of another apparatus includes a processor circuit, and logic to visually present a first table of multiple visual areas of a user interface and at least one variation of content presentation for each visual area of the multiple visual areas on a display to enable selection of at least one visual area and at least one variation of content presentation for inclusion in an A/B test of multiple versions of the user interface, generate a list of all possible combinations of variations in content presentation selected in response to the visual presentation of the first table for all visual areas selected in response to the visual presentation of the first table, and visually present a second table of all of the possible combinations of selected variations in content for all of the selected visual areas on the display to enable selection of at least one of the possible combinations for inclusion in the A/B test.

The above example of another apparatus in which the logic is to identify the multiple visual areas in an interaction data to provide the user interface, and visually present identifiers for the multiple visual areas in a menu in a portion of the first table to enable selection of one visual area of the multiple visual areas for the portion of the first table.

Either of the above examples of another apparatus in which the logic is to visually present on the display a first virtual control operable to add a portion to the second table corresponding to a possible combination of variations of content presentation for a selected visual area, visually present the second table on the display with the portion added in response to operation of the first virtual control, and visually present a second virtual control in the portion operable to remove the portion from the second table.

Any of the above examples of another apparatus in which the logic is to visually present a third virtual control in the portion operable to designate the possible combination of variations of content presentation for the selected visual area as a control in subsequent statistical analysis.

Any of the above examples of another apparatus in which the logic is to visually present on the display a virtual control operable to cause visual presentation of the second table, and visually present the second table in response to operation of the virtual control.

Any of the above examples of another apparatus in which the logic is to use a first interaction data that provides the user interface to generate a second interaction data that provides at least one version of the user interface to test at least one of the possible combinations of variations of content presentation indicated in the second table as selected for inclusion in the A/B test.

An example of a computer-implemented method includes identifying multiple visual areas of a visible portion of a user interface in a first interaction data, visually presenting on a display the multiple visual areas in at least one menu in a first table to enable selection of first and second visual areas of the multiple visual areas for inclusion in an A/B test of multiple versions of the user interface, and visually presenting a list of all possible combinations of variations in content presentation selected in response to the visual presentation of the first table for the first and second visual areas in the form of a second table.

The above example of a computer-implemented method in which the method includes visually presenting a first menu of the at least one menu in a first portion of the first table to enable selection of the first visual area, visually presenting a second menu of the at least one menu in a second portion of the first table to enable selection of the second visual area, and prompting a selection of at least one variation in content presentation for each of the first and second visual areas.

Either of the above examples of a computer-implemented method in which the method includes visually presenting on the display a first virtual control operable to add a portion to the second table corresponding to a possible combination of variations of content presentation for a selected visual area, visually presenting the second table on the display with the portion added in response to operation of the first virtual control, and visually presenting a second virtual control in the portion operable to remove the portion from the second table.

Any of the above examples of a computer-implemented method in which the method includes visually presenting a third virtual control in the portion operable to designate the possible combination of variations of content presentation for the selected visual area as a control in subsequent statistical analysis.

Any of the above examples of a computer-implemented method in which the method includes visually presenting on the display a virtual control operable to cause visual presentation of the second table, and visually presenting the second table in response to operation of the virtual control.

Any of the above examples of a computer-implemented method in which the method includes using the first interaction data to generate a second interaction data that provides at least one version of the user interface to test at least one of the possible combinations of variations of content presentation indicated in the second table as selected for inclusion in the A/B test.

Any of the above examples of a computer-implemented method in which the method includes receiving the first interaction data via a network from another computing device, and transmitting the second interaction data via the network to the other computing device.

An example of at least one machine-readable storage medium includes instructions that when executed by a computing device, cause the computing device to identify multiple visual areas of a visible portion of a user interface in a first interaction data, visually present on a display of the computing device the multiple visual areas in at least one menu in a first table to enable selection of first and second visual areas of the multiple visual areas for inclusion in an A/B test of multiple versions of the user interface, and visually present a list of all possible combinations of variations in content presentation selected in response to the visual presentation of the first table for the first and second visual areas in the form of a second table.

The above example of at least one machine-readable storage medium in which the computing device is caused to visually present a first menu of the at least one menu in a first portion of the first table to enable selection of the first visual area, visually present a second menu of the at least one menu in a second portion of the first table to enable selection of the second visual area, and visually present a prompt on the display for a selection of at least one variation in content presentation for each of the first and second visual areas.

Either of the above examples of at least one machine-readable storage medium in which the computing device is caused to visually present on the display a virtual control operable to cause visual presentation of the second table, and visually present the second table in response to operation of the virtual control.

Any of the above examples of at least one machine-readable storage medium in which the computing device is caused to use the first interaction data to generate a second interaction data that provides at least one version of the user interface to test at least one of the possible combinations of variations of content presentation indicated in the second table as selected for inclusion in the A/B test.

Any of the above examples of at least one machine-readable storage medium in which the computing device is caused to receive the first interaction data via a network from another computing device, and transmit the second interaction data via the network to the other computing device.

The invention claimed is:

1. An apparatus comprising:
   a processor circuit; and logic to:
   visually present a first prompt on a display requesting selection of a first visual area of a user interface, at least one variation of content presentation in the first visual area, a second visual area of the user interface, and at least one variation of content in the second visual area for an A/B test of multiple versions of the user interface;
   receive a first response to the first prompt indicating selection of the first and second visual areas, at least one variation in content presentation in the first and second visual areas;
   generate a list of all possible combinations of variations in content presentation in the first and second visual areas based on the first response; and
   visually present the list as a table in a second prompt on the display requesting selection of at least one of the possible combinations for inclusion in the A/B test.

2. The apparatus of claim 1, the logic to:
   identify the first and second visual areas in an interaction data to provide the user interface; and
   visually present identifiers of the first and second visual areas in the first prompt to enable selection of the first and second visual areas.

3. The apparatus of claim 1, the logic to:
   receive a second response to the second prompt indicating selection of at least one of the possible combinations for inclusion in the A/B test; and
   visually present the table as altered based on the second response to visually present only the at least one of the possible combinations as selected for inclusion in the A/B test.

4. The apparatus of claim 3, the logic to use a first interaction data that provides the user interface to generate a second interaction data that provides at least one version of the user interface to test the at least one of the possible combinations selected for inclusion in the A/B test.

5. The apparatus of claim 4, the logic to:
   receive the first interaction data via a network from another computing device; and
   transmit the second interaction data via the network to the other computing device.

6. The apparatus of claim 1, the logic to:
   visually present a virtual control in the second prompt operable to visually present the table;
   receive a signal indicating selection of the virtual control; and
   visually present the table in response to the signal.

7. An apparatus comprising:
   a processor circuit; and
   logic to:
   visually present a first table of multiple visual areas of a user interface and at least one variation of content presentation for each visual area of the multiple visual areas on a display to enable selection of at least one visual area and at least one variation of content presentation for inclusion in an A/B test of multiple versions of the user interface;
   generate a list of all possible combinations of variations in content presentation selected in response to the visual presentation of the first table for all visual areas selected in response to the visual presentation of the first table; and
   visually present a second table of all of the possible combinations of selected variations in content for all of the selected visual areas on the display to enable selection of at least one of the possible combinations for inclusion in the A/B test.

8. The apparatus of claim 7, the logic to:
   identify the multiple visual areas in an interaction data to provide the user interface; and
   visually present identifiers for the multiple visual areas in a menu in a portion of the first table to enable selection of one visual area of the multiple visual areas for the portion of the first table.

9. The apparatus of claim 7, the logic to:
   visually present on the display a first virtual control operable to add a portion to the second table corresponding to a possible combination of variations of content presentation for a selected visual area;
   visually present the second table on the display with the portion added in response to operation of the first virtual control; and
   visually present a second virtual control in the portion operable to remove the portion from the second table.

10. The apparatus of claim 9, the logic to visually present a third virtual control in the portion operable to designate the possible combination of variations of content presentation for the selected visual area as a control in subsequent statistical analysis.

11. The apparatus of claim 7, the logic to:
    visually present on the display a virtual control operable to cause visual presentation of the second table; and
    visually present the second table in response to operation of the virtual control.

12. The apparatus of claim 7, the logic to use a first interaction data that provides the user interface to generate a second interaction data that provides at least one version of the user interface to test at least one of the possible combinations of variations of content presentation indicated in the second table as selected for inclusion in the A/B test.

13. A computer-implemented method comprising:
    identifying multiple visual areas of a visible portion of a user interface in a first interaction data;
    visually presenting on a display the multiple visual areas in at least one menu in a first table to enable selection of first and second visual areas of the multiple visual areas for inclusion in an A/B test of multiple versions of the user interface; and
    visually presenting a list of all possible combinations of variations in content presentation selected in response to the visual presentation of the first table for the first and second visual areas in the form of a second table.

14. The computer-implemented method of claim 13, the method comprising:

visually presenting a first menu of the at least one menu in a first portion of the first table to enable selection of the first visual area;

visually presenting a second menu of the at least one menu in a second portion of the first table to enable selection of the second visual area; and prompting a selection of at least one variation in content presentation for each of the first and second visual areas.

15. The computer-implemented method of claim 13, the method comprising:

visually presenting on the display a first virtual control operable to add a portion to the second table corresponding to a possible combination of variations of content presentation for a selected visual area;

visually presenting the second table on the display with the portion added in response to operation of the first virtual control; and visually presenting a second virtual control in the portion operable to remove the portion from the second table.

16. The computer-implemented method of claim 15, the method comprising visually presenting a third virtual control in the portion operable to designate the possible combination of variations of content presentation for the selected visual area as a control in subsequent statistical analysis.

17. The computer-implemented method of claim 13, the method comprising:

visually presenting on the display a virtual control operable to cause visual presentation of the second table; and visually presenting the second table in response to operation of the virtual control.

18. The computer-implemented method of claim 13, the method comprising using the first interaction data to generate a second interaction data that provides at least one version of the user interface to test at least one of the possible combinations of variations of content presentation indicated in the second table as selected for inclusion in the A/B test.

19. The computer-implemented method of claim 18, the method comprising:

receiving the first interaction data via a network from another computing device; and transmitting the second interaction data via the network to the other computing device.

20. At least one non-transitory machine-readable storage medium comprising instructions that when executed by a computing device, cause the computing device to:

identify multiple visual areas of a visible portion of a user interface in a first interaction data;

visually present on a display of the computing device the multiple visual areas in at least one menu in a first table to enable selection of first and second visual areas of the multiple visual areas for inclusion in an A/B test of multiple versions of the user interface; and visually present a list of all possible combinations of variations in content presentation selected in response to the visual presentation of the first table for the first and second visual areas in the form of a second table.

21. The at least one machine-readable storage medium of claim 20, the computing device caused to:

visually present a first menu of the at least one menu in a first portion of the first table to enable selection of the first visual area;

visually present a second menu of the at least one menu in a second portion of the first table to enable selection of the second visual area; and visually present a prompt on the display for a selection of at least one variation in content presentation for each of the first and second visual areas.

22. The at least one machine-readable storage medium of claim 20, the computing device caused to:

visually present on the display a virtual control operable to cause visual presentation of the second table; and visually present the second table in response to operation of the virtual control.

23. The at least one machine-readable storage medium of claim 20, the computing device caused to use the first interaction data to generate a second interaction data that provides at least one version of the user interface to test at least one of the possible combinations of variations of content presentation indicated in the second table as selected for inclusion in the A/B test.

24. The at least one machine-readable storage medium of claim 23, the computing device caused to:

receive the first interaction data via a network from another computing device; and transmit the second interaction data via the network to the other computing device.

* * * * *